United States Patent Office 3,218,344
Patented Nov. 16, 1965

3,218,344
ALKOXY SUBSTITUTED ORGANOSILICON COMPOUNDS
Donald L. Bailey, Snyder, N.Y., assignor to Union Carbide Corporation, a corporation of New York
No Drawing. Filed June 29, 1959, Ser. No. 823,283
1 Claim. (Cl. 260—448.8)

This invention relates to novel organosilicon compounds and processes for their production.

This invention provides siloxanes that contain at least one unit that is represented by the formula:

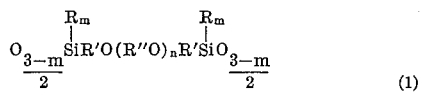

$$O_{\frac{3-m}{2}}SiR'O(R''O)_nR'SiO_{\frac{3-m}{2}} \quad (1)$$

wherein R is a monovalent hydrocarbon radical or a halogenated monovalent hydrocarbon radical, R' is a divalent hydrocarbon radical, R'' is an alkylene radical containing at least two carbon atoms, $n$ is an integer having a value of at least one, and $m$ has a value from 0 to 2. In Formula 1 R can represent the same or different radicals and $n$ preferably has a value from 4 to 30. In Formula 1, R'' can represent the same or different radicals i.e. the group $(R''O)_n$ can represent, for example, the groups: —$(C_2H_4O)_p$—, —$(C_2H_4O)_p(C_3H_6)_q$—

—$(C_3H_6O)$— or —$(C_2H_4O)_p(C_8H_{16}O)_q$— where $p$ and $q$ are integers having a value of at least one.

The monovalent hydrocarbon radicals represented by R in Formula 1 can be saturated or olefinically unsaturated or can contain benzenoid unsaturation. Illustrative of the monovalent hydrocarbon radicals represented by R in Formula 1 are the linear aliphatic radicals (e.g. the methyl, ethyl and octadecyl radicals), the cycloaliphatic radicals (e.g., the cyclohexyl and the cyclopentyl radicals), the aryl radicals (e.g., the phenyl, tolyl, xenyl and naphthyl radicals), the aralkyl radicals (e.g., the benzyl and beta-phenylethyl radicals), the unsaturated linear aliphatic radicals (e.g., the vinyl, allyl and hexenyl radicals) and the unsaturated cycloaliphatic radicals (e.g., the cyclohexenyl radical).

The halogenated monovalent hydrocarbon radicals represented by R in Formula 1 can be saturated or olefinically unsaturated or can contain benzenoid unsaturation. Illustrative of the halogenated monovalent hydrocarbon radicals represented by R in Formula 1 are the halogenated linear alkyl radicals (e.g., the chloromethyl, gamma-chloropropyl, trifluoropropyl, and tetrafluoroethyl radicals), the halogenated cyclic alkyl radicals( e.g., the chlorotrifluorocyclobutyl, dichlorocyclohexyl and monochlorocyclopentyl radicals), the halogenated alkenyl radicals (e.g., the trifluorovinyl and chlorodifluorovinyl radicals) and the halogenated aryl radicals (e.g., the alpha, alpha alpha-trifluorotolyl, bromophenyl, tetrabromoxenyl, bromoxenyl and chlorophenyl radicals).

Illustrative of the divalent hydrocarbon radicals represented by R' in Formula 1 are the alkylene radicals (e.g., the methylene, ethylene, 1,3-propylene, 1,4-butylene and 1,18-octadecylene radicals), the arylene radicals (e.g., the phenylene radical) and the alkarylene radicals (e.g., the phenytethylene radicals). In Formula 1, R' is preferably an alkylene radical containing at least two carbon atoms.

Illustrative of the alkylene radicals containing at least two carbon atoms represented by R'' in Formula 1 are the ethylene, 1,2-propylene, 1,3-propylene, 1,6-hexylene, 2-ethylhexylene-1,6 and 1,18-octadecylene radicals.

This invention further provides a process for producing siloxanes tha tcontain at least one group that is represented by Formula 1 which process involves reacting a silicone polymer containing at least one group that is represented by the formula:

$$XR'SiO_{\frac{3-m}{2}} \quad (2)$$

wherein R, R' and $m$ have the meanings defined for Formula 1 and X is a halogen atom, preferably a chlorine atom, and a salt represented by the formula:

$$MO(R''O)_nM \quad (3)$$

wherein R'' and $n$ have the meanings defined for Formula 1 and M is an alkali metal, preferably sodium or potassium. This process is referred to herein as the "metathesis process."

This invention still further provides a process for producing those siloxanes that contain at least one group that is represented by Formula 1 wherein R' is an alkylene group containing at least two carbon atoms which process involves reacting a silicone polymer containing at least one group represented by the formula:

$$HSiO_{\frac{3-m}{2}} \quad (4)$$

wherein R and $m$ have the meanings defined for Formula 1 and an alkenyl ether represented by the formula:

$$QO(R''O)_nQ \quad (5)$$

wherein R'' and $n$ have the meanings defined for Formula 1 and Q is an alkenyl group, in the presence of a platinum catalyst. This process is referred to herein as the "addition process."

The siloxanes of this invention include both homopolymeric siloxanes containing only units represented by Formula 1 and copolymeric siloxanes containing at least one unit represented by Formula 1 and at least one unit represented by the formula:

$$R'''_xSiO_{\frac{4-x}{2}} \quad (6)$$

wherein R''' is a monovalent hydrocarbon radical or a halogenated monovalent hydrocarbon radical and $x$ has a value from 1 to 3. Limited amounts of $SiO_2$ groups and hydrogen siloxy groups represented by Formula 4 can also be present in the siloxanes of this invention. In Formula 6, R''' can represent the same or different radicals. Preferably, the copolymeric siloxanes of this invention contain from 0.1 to 99.9 mole percent of siloxane units having Formula 1 and from 0.1 to 99.9 mole percent of siloxane units having Formula 6.

Illustrative of the monovalent hydrocarbon radicals represented by R''' in Formula 6 are the linear aliphatic radicals (e.g., the methyl, ethyl and octadecyl radicals), the cycloaliphatic radicals (e.g., the cyclohexyl and cyclopentyl radicals), the aryl radicals (e.g., the phenyl, tolyl, xenyl and naphthyl radicals), the aralkyl radicals (e.g., the benzyl and beta-phenylethyl radicals), the unsaturated linear aliphatic radicals (e.g., the vinyl, allyl and hexenyl radicals), and the unsaturated cycloaliphatic radicals (e.g., the cyclohexenyl radical).

Illustrative of the halogenated monovalent hydrocarbon radicals represented by R''' in Formula 6 are the halogenated linear alkyl radicals (e.g., the chloromethyl, gamma-chloropropyl, trifluoropropyl and tetrafluoroethyl radicals), the halogenated cyclic alkyl radicals (e.g., the chloroetrifluorocyclobutyl, dichlorocyclohexyl and monochlorocyclopentyl radicals), the halogenated alkenyl radicals (e.g., the trifluorovinyl and chlorodifluorovinyl radicals), and the halogenated aryl radicals (e.g., the alpha, alpha, alpha-trifluorotolyl, bromophenyl, tetrabromoxenyl, bromoxenyl and chlorophenyl radicals).

The metathesis process employed in producing the siloxanes of this invention involves a metathesis reaction that is represented by the equation:

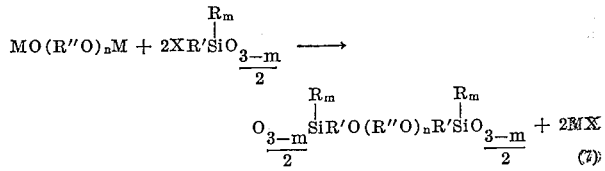

wherein R, R', m and X have the meanings defined for Formula 2 and R'', n and M have the meanings defined for Formula 3.

The silicone polymers that are used as starting materials in producing the siloxanes of this invention by the metathesis process contain at least one group that is represented by Formula 2 and can also contain one or more groups that are represented by Formula 6. These starting silicone polymers can be produced by various known processes. By one known process an organochlorosilane (e.g., methyltrichlorosilane) and a chlorinating agent (e.g., sulfuryl chloride in the presence of a peroxide and chlorine in the presence of an iron catalyst) are reacted to produce a chloroorganochlorosilane (e.g., chloromethyltrichlorosilane). The chloroorganochlorosilane so produced is hydrolyzed and condensed along with, if desired, organochlorosilanes (e.g., dimethyldichlorosilane) to produce the starting silicone. By another process, a starting silicone is produced by reacting a silicone polymer containing hydrogen bonded to silicon and a halogen-substituted olefin (e.g., allyl chloride) in the presence of a platinum catalyst to produce the starting silicone polymer.

The salts that are used as starting materials in producing the siloxanes of this invention by the metathesis process (i.e., compounds represented by Formula 3 include both salts of monomeric dihydroxyl compounds (e.g., HOCH$_2$CH$_2$OH) and salts of polymeric dihydroxy compounds (e.g., hydroxy-end-blocked oxyethylene or oxypropylene polymers). Suitable hydroxyl end-blocked oxyalkylene polymers can be produced by known processes such as the process which is described in detail in United States Patent 2,425,845. One such process for producing hydroxyl end-blocking oxyalkylene polymers involves the addition of an oxyalkylene oxide to a compound containing two hydroxyl groups (termed a "starter") such as ethylene glycol, 2-ethyl hexanediol and the like to produce the oxyalkylene polymer. The dihydroxy compounds are converted to the starting salts used in the metathesis process by reacting the dihydroxy compounds with an alkali metal hydroxide or with an alkali metal alkoxide to produce the starting salt. Alternately the dihydroxy compounds can be converted to starting salts by reacting the dihydroxy compounds and an alkali metal hydride to produce the starting salt and, as a by-product, hydrogen.

The temperature used in producing the siloxanes of this invention by the metathesis process is not narrowly critical. Temperatures of from 50° C. to 200° C. are useful but temperatures of from 80° C. to 150° C. are preferred. Although other temperatures may be used it has been found desirable to produce the siloxanes by adhering to the indicated temperature ranges.

The metathesis reaction represented by Equation 7 is conveniently conducted within a liquid organic compound in which the starting silicone and the starting salt are mutually soluble. By way of illustration, a solution containing a liquid organic compound (such as toluene, benzene, xylene, dibutyl ether or cyclohexane), the starting silicone and the starting salt can be formed and then the mixture can be heated to cause the siloxane and the salt to react within the liquid organic compound to produce a siloxane of this invention. Preferred liquid organic compounds in which the starting materials can be dissolved are toluene and xylene. The amount of the liquid organic compound used is not narrowly critical and may vary from 25 parts by weight to 100 parts by weight of the liquid organic compound per 100 parts by weight of the starting compounds. Preferably, from 100 parts by weight to 500 parts by weight of the liquid organic compound per 100 parts by weight of the starting compounds are used. Since the amount of the liquid organic compound is not critical, departures from the indicated amounts are permissible but produce no particular beneficial effect.

At conclusion of the reaction represented by Equation 7, the liquid organic compound in which reaction was conducted can be removed from the siloxane formed in the reaction by heating the mixture to volatilize the liquid organic compound, preferably at subatmospheric pressure.

The alkali metal halide (i.e., MX) produced in the reaction represented by Equation 7 usually precipitates from the reaction mixture used in producing the siloxanes of this invention. These alkali metal halides are conveniently separated from the reaction mixture by filtering the reaction mixture or centrifuging the reaction mixture and decanting the liquid portion.

The relative amount of the reactants used in the metathesis process is not narrowly critical. Amounts of starting compounds that provide either stoichiometric amounts of —OM and silicon-bonded, halogen-substituted monovalent hydrocarbon groups or a small excess of the latter groups are usually preferred.

Siloxanes of this invention produced by the reaction represented by Equation 7 can contain some —OM groups where M has the above-defined meaning or silicon-bonded, halogen-substituted monovalent hydrocarbon groups. The presence of these groups is due either to the incomplete reaction of the starting materials or to the presence of an excess of these groups in the starting oxyalkylene polymer. Such —OM groups in the siloxane can be removed by washing the siloxane with an acid, such as hydrochloric acid. Alternately these —OM groups may be intentionally left in the siloxane, e.g., to serve as "built in" basic catalysts for subsequent equilibration reactions. Unreacted silicon-bonded, halogen-substituted monovalent hydrocarbon groups in the siloxane (i.e., XR'— groups) provide reactive sites that permit modification of the polymer by reaction with other materials.

The metathesis process is preferred over the addition process in producing siloxanes of this invention containing olefinically unsaturated groups. Such groups can undergo undesirable side reaction during the addition process but remain intact during the metathesis process.

The addition process used in producing siloxanes of this invention involves an addition reaction that can be represented by the equation:

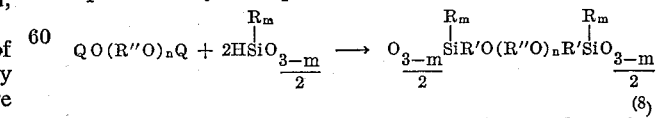

wherein R'', n and Q have the meanings defined for Formula 5, R, and m have the meanings defined for Formula 1 and R' is an alkylene radical containing at least two carbon atoms. The alkenyl radical represented by B is converted to an alkylene radical represented by R' in the reaction represented by Equation 8. The addition process is conveniently conducted at a temperature from 25° C. to 200° C.

The starting silicone polymers used in producing the siloxanes of this invention by the addition process contain at least one group represented by Formula 4 and can also contain one or more groups represented by Formula 6. These starting silicones can be produced by known procedures. By way of illustration, a starting silicone can be produced by hydrolyzing and condensing a hydrogenhalosilane (e.g., methylhydrogendichlorosilane) along with, if desired, a hydrocarbonhalosilane (e.g., dimethyldichlorosilane), to produce a starting siloxane. As a further illustration, a starting silicone can be produced by equilibrating a hydrogensiloxane (e.g., dimethylsiloxane cyclic tetramer and/or hexamethyldisiloxane) in the presence of an acidic catalyst (e.g., sulfuric acid) to produce a starting silicone.

The starting alkenyl ethers used in producing the siloxanes of this invention by the addition process can be produced by known processes. By way of illustration, a monomeric dihydroxy compound (e.g., $HOCH_2CH_2OH$) or dihydroxy end-blocked oxyalkylene polymer (e.g., $HO(C_2H_4O)_{16}H$ and acetylenically unsaturated aliphatic compound (e.g., acetylene) can be reacted in the presence of a catalyst (e.g., potassium hydroxide) to produce a starting alkenyl ether (e.g., $$H_2C=CHOCH_2CH_2OCH=CH_2$$

or $H_2C=CHO(C_2H_4)_{16}OCH=CH_2$). Hydroxy end-blocked oxyalkylene polymers that are useful in producing these starting alkenyl ethers which are described in detail in United States Patent 2,425,845.

The platinum catalyst used in the addition process for producing the siloxanes of this invention include finely divided elemental platinum (supported, if desired, on materials such as charcoal, asbestos and/or silica gel) and platinum compounds such as chloroplatinic acid. The preferred catalyst is finely divided platinum supported on the gamma allotrope of alumina. Amounts of catalysts that provide from 0.001 to 5.0 parts by weight of platinum per 100 parts by weight of the reactants are generally useful. At the completion of the reaction, the catalyst can be removed from the reaction mixture by suitable means, e.g., by filtration.

The reaction represented by Equation 8 can be conducted within a liquid organic compound (solvent) in which the reactants are mutually soluble. Suitable solvents include xylene, toluene, benzene, n-butyl ether. The amount of the liquid organic compound used is not narrowly critical and may vary from 25 parts by weight to 100 parts by weight of the liquid organic compound per 100 parts by weight of the starting compounds. Preferably, from 100 parts by weight to 500 parts by weight of the liquid organic compound per 100 parts by weight of the starting compounds are used. Since the amount of the liquid organic compound is not critical, departures from the indicated amounts are permissible but produce no particular beneficial effect. At the completion of the reaction, the solvent can be removed from the reaction mixture by suitable means, e.g., by heating the reaction mixture to volatilize the solvent.

The relative amounts of the starting materials used in the addition process is not narrowly critical. Amounts of the starting materials that provide stoichiometric amounts of hydrogensiloxane groups and alkenyloxy groups are preferred although other amounts may be used. When other than stoichiometric amounts of these groups are present, the siloxane produced can contain unreacted hydrogensiloxy and alkenyloxy groups. The presence of such unreacted groups in the copolymer are desirable, e.g., where it is desired to have reactive sites in the copolymer so that the siloxane can be reacted with other materials.

In the above-described metathesis and addition processes suitable alkoxysilanes can be employed as reactants in lieu of the indicated starting silicone polymers. When suitable alkoxysilanes are employed in these processes, the product is a compound having the formula:

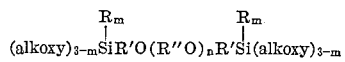  (9)

wherein R, R', R'', m and n have the meanings defined for Formula 1 and "alkoxy" denotes a methoxy, ethoxy, propoxy or butoxy radical. Such products can be converted to the siloxanes of this invention by conventional hydrolysis and condensation procedures. Suitable starting alkoxysilanes that can be used in the metathesis process are those represented by the formula:

  (10)

wherein, R, R', X and m have the meanings defined for Formula 2. Suitable starting alkoxysilanes that can be used in the addition process are those represented by the formula:

  (11)

wherein R and m have the meanings defined for Formula 1. Hydrocarbon(alkoxy)silanes, i.e. silanes represented by the formula:

$$R'''Si(alkoxy)_{4-x} \qquad (12)$$

wherein R''' and x have the meanings defined for Formula 6, can be cohydrolyzed and cocondensed by conventional procedures with products represented by Formula 9 in order to produce siloxanes of this invention containing both units represented by Formula 1 and units represented by Formula 6.

The silicone content of the siloxanes of this invention can be increased by an equilibration process which involves reacting a siloxane of this invention and a conventional silicone polymer in the presence of an equilibration catalyst to produce a siloxane of this invention having a higher silicone content than the starting siloxane of this invention.

Suitable equilibration catalyst include such basic compounds as the alkali metal oxides, hydroxides and silanolates and tetraorganoammonium hydroxides and silanolates. Preferably, the equilibration catalyst is potassium dimethylsilanolate or tetramethylammonium hydroxide of silanolate. The amount of basic compound used as equilibration catalyst is not narrowly critical and can range from 0.005 part to 2.0 parts by weight of the basic compound per 100 parts by weight of the reactants, but preferably from 0.01 part to 1.0 part by weight of the basic compound per 100 parts by weight of the reactants are employed. Other than the indicated amounts of the catalysts are usually not as beneficial but can be used if desired.

The temperature used in the equilibration process can vary widely. The equilibration process can be conducted at a temperature of from 25° C. to 200° C. but preferably from 80° C. to 160° C. Other than the indicated temperature can be employed in the equilibration process but it is not particularly desirable to deviate from the indicated ranges since no commensurate advantage is obtained.

Occasionally, it is desirable to mix the siloxane of this invention and the conventional silicone polymer with a liquid organic compound in which they are mutually soluble and then conduct the equilibration process within the liquid organic compound. The use of such liquid organic compounds is indicated in those cases where the siloxane and/or the silicone are viscous and hence difficult to mix adequately and bring into reactive contact. Illustrative of the liquid such organic compounds are liquid hydrocarbons such as toluene, benzene and the like. The amount of the liquid organic compound used is not narrowly critical and may vary from 25 parts by weight to 100 parts by weight of the liquid organic compound per 100 parts by weight of the starting compounds. Preferably, from 100 parts by weight to 500 parts by weight of the liquid organic compound per 100 parts by weight of the starting compounds are used. Since the amount of the liquid organic compound is not critical, departures from the indicated amounts are permissible but produce no particular beneficial effect. However, the equilibration process is preferably conducted without such a liquid organic compound.

In general, any conventional silicone polymer is useful as a reactant in the equilibration process. Illustrative of useful silicone polymers are cyclic siloxanes such as dimethylsiloxane cyclic trimer and dimethylsiloxane cyclic tetramer.

The siloxanes of this invention posses excellent high temperature lubricating properties and are particularly useful as lubricants for steel surfaces. In addition, they can be dispersed or dissolved in suitable carriers (e.g., water, alcohols, ketones, etc.) and applied to molds on which they can function as mold release agents after the carrier is volatilized. Other applications in which the siloxanes of this invention can be used to advantage are as hydraulic fluids, damping fluids and emulsifying agents for mixture of water and organic solvents (e.g., toluene). An outstanding property of the siloxanes of this invention that render them particularly useful in the above applications is their stability both in acidic and strongly basic environments and at elevated temperatures.

The following examples illustrate the present invention. In the examples and in the claims the symbol "Me" is used to designate the methyl group and "—$C_3H_6$—" is used to denote the 1,2-propylene group (i.e.—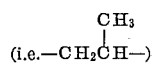)

Example I

A mixture was formed in a 250-cc. three-necked flask that was equipped with a stirrer, a reflux condenser and a thermometer. The mixture contained 50 g. (0.05 mole) of a dialkenyl ether of an oxylalkylene polymer that had the average formula $$CH_2=CHO(CH_2CH_2O)_{19}C_8H_{16}OCH=CH_2$$

35.7 g. (0.15 mole) of a silicone polymer represented by the formula [$Me_3SiO(EtSiHO)SiMe_3$] and 1 g. (1.2 parts by weight per 100 parts by weight of the ether and the silicone polymer) of a platinum-on-gamma alumina catalyst that contained 1 part by weight of the platinum per 100 parts by weight of the platinum and gamma-alumina. The mixture was continuously stirred while heated at 150–160° C. for 7 hours. Then the flask was cooled to room temperature. The contents of the flask were filtered and the filtrate so produced was heated at 180° C. and at 1 mm. Hg to remove volatile materials (including 11.9 g. of the starting siloxane polymer), and to produce a residue. The residue was 70.5 g. of a siloxane of this invention that was an oil having a viscosity of 83 centistokes at 25° C. and that contained 11.4 parts by weight silicon per 100 parts by weight of the siloxane. Theoretically, the siloxane should have contained 11.5 parts by weight silicon per 100 parts by weight of the siloxane. The siloxane had the average formula:

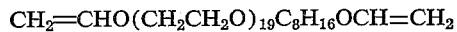

Example II

Following the general procedure described in Example I a siloxane of this invention was produced by heating a dialkenyl ether of an oxylkylene polymer and a silicone polymer containing silanic hydrogen at a temperature of 160° for 6 hours in the presence of a catalytic amount of platinum supported on the gamma allotrope of alumina. The starting ether had the average formula:

$$CH_2=CHO(CH_2CH_2O)_{19}C_8H_{16}OCH=CH_2$$

and the starting silicone polymer had the formula:

$$Me_3SiO(C_2H_5SiHO)_2SiMe_3$$

The siloxane so produced was isoluble in water and had a viscosity of 1720 centistokes at 25° C. The siloxane contained units having the average formula:

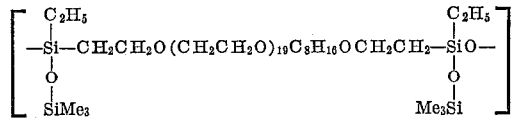

Example III

Following the general procedure described in Example I a siloxane of this invention was produced by heating a dialkenyl ether of an oxyalkylene polymer (0.05 mole) and a silicone polymer containing silanic hydrogen (0.05 mole) at a temperature of 150° C. for 10 hours in the presence of a catalytic amount of platinum supported on the gamma allotrope of alumina. The starting ether had the average formula:

$$CH_2=CHO(CH_2CH_2O)_{19}C_8H_{16}OCH=CH_2$$

and the starting silicone polymer had the average formula:

$$Me_3SiO(C_2H_5SiHO)_3SiMe_3$$

The siloxane so produced was insoluble in water and had a viscosity of 2326 centistokes at 25° C. The siloxane contained united having the average formula:

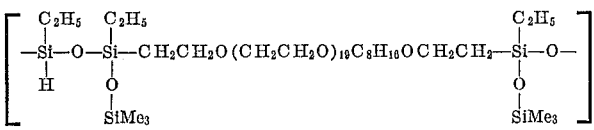

Example IV

A mixture was formed in a one-liter flask that was fitted with a reflux condenser and a stirrer. The mixture contained 57 g. (0.1 mole) of a silicone polymer that had the average formula $Me_2SiO(Me_2SiO)_4(MeSiHO)_2SiMe_3$, 120 g. (0.12 mole) of a dialkenyl ether of an oxyalkylene polymer that had the formula $$CH_2=CHO(CH_2CH_2O)_{19}C_8H_{16}OCH=CH_2$$

5.4 g. (3.1 parts by weight per 100 parts by weight of the silicone polymer and the ether) of a platinum-on-gamma alumina catalyst that contained 2 parts by weight of platinum per 100 parts by weight of platinum and gamma alumina and 95 g. of n-butyl ether. The mixture was heated at 150° C. for 11.5 hours during which time the mixture refluxed. Then the contents of the flask were filtered to remove the catalyst and the filtrate so produced was subjected to reduced pressure to remove the volatile material and to produce a residue. The residue so produced was 146 g. of a siloxane of this invention that was a dark viscous homogeneous oil having a viscosity of 762 centistokes at 100° F. This siloxane was insoluble in water and contained 12.0 parts by weight silicon per 100 parts by weight of the copolymer. Theoretically, the siloxane should have contained 14.2 parts by weight silicon per 100 parts by weight of the siloxane. The siloxane contained units having the average formula:

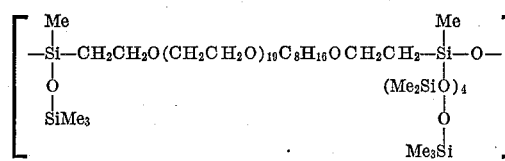

Example V

The siloxane of this invention produced in Example IV was evaluated as a lubricant in a Falex Lubricant Test Machine. The machine consists of a steel shaft and two steel V-blocks that are positioned so that they can be forced against the shaft. The shaft and the V-blocks are immersed in the lubricant to be tested. The shaft is rotated and a load is applied to the V-blocks, forcing them against the shaft. The load is increased until failure occurs (i.e. seizure between the rotating shaft and the V-blocks or a radical increase in wear with no increase in load). The load at which failure occurs is the "Falex Load" value for the lubricant. The Falex Load values for the siloxane of Example IV and, for comparison, for various known fluids are as follows:

| Fluid: | Falex Load (pounds) |
|---|---|
| Siloxane of Example IV | 1000 |
| $C_4H_9(OC_3H_6)_6OH$ | 400 |
| $C_4H_9(OC_3H_6)_{17.7}OH$ | 1250 |
| Dimethylpolysiloxane oil | <100 |
| Gulf security oil "A" (a refined petroleum oil having a viscosity of about 44 SUS at 210° F.) | <500 |
| Kendall automatic transmission oil (a refined parraffinic hydrocarbon oil having a viscosity of about 52 SUS at 210° F.) | <500 |

Siloxanes of this invention can be produced by the metathesis and addition processes described herein from starting silicone polymers and starting oxyalkylene polymers containing other groups in addition to those indicated above. By way of illustration, siloxanes can be produced by the addition process from the silicones described above as useful in the addition process and alkenyloxy end-blocked oxyalkylene polymers that contain groups derived from organic compounds containing three or more hydroxyl substituents. As a further illustration, siloxanes can be produced by either the addition or metathesis processes from starting silicones containing a polyvalent hydrocarbon group that is attached to two or more siloxane groups by carbon to silicone bonds. As a still further illustration, siloxanes can be produced by the addition process from the silicones described above as useful in the addition process and starting oxyalkylene polymers containing acrylate end-blocking groups. The latter mentioned addition process produces a siloxane containing a silicone moiety by a linkage containing a carbonyl group.

Starting oxyalkylene polymers that contain groups derived from organic compounds containing three or more hydroxyl substituents can be produced by employing organic compounds containing three or more hydroxyl substituents as starters in the reaction that produces the oxyalkylene polymer. Illustrative of such organic compounds containing three or more hydroxyl substituents are glycerine; 1,2,6-hexanetriol; 1,3,5-hexanetriol; trimethylolmethane; trimethylolethane and the like. Siloxanes that are produced from oxyalkylene polymers having units derived from such polyhydroxy compounds possess additional cross-linking due to the presence of the groups derived from the polyhydroxy compound.

Starting silicone polymers containing hydrocarbon groups that are attached to two or more siloxane groups by carbon to silicon bonds can be produced from poly(alkoxysilyl)alkanes by known processes. By way of illustration, poly(alkoxysilyl)alkanes such as bis(trialkoxysilyl)ethane, tris(triethoxysilyl)butane or tris(triethoxysilyl)hexane can be mixed with an alkoxysilane containing a silicon-bonded, halogen-substituted hydrocarbon group and, if desired, hydrocarbonalkoxysilanes and the mixture processed according to known hydrolysis and equilibration processes to produce the starting silicone polymer. The starting silicone polymer can then be used in producing siloxanes by the metathesis process.

Starting oxyalkylene polymers containing acrylate groups as end-blocking groups can be produced by known esterification processes. By way of illustration, these starting oxyalkylene polymers can be produced employing hydroxy end-blocked oxyethylene homopolymers [e.g., $HO(C_2H_4O)_mH$] and methacrylic acid to produce an oxyalkylene polymer containing acrylate end-blocking groups such as the polymer represented by the graphical formula:

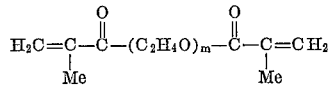

wherein $m$ is an integer that has a value of from 2 to 14. The latter-mentioned starting oxyalkylene polymer can be employed along with a silicone polymer containing silanic hydrogen as starting materials in the above-described addition process to produce a siloxane that contains two silicone moieties linked to an oxyalkylene moiety by linkages each of which contains a carbonyl group.

What is claimed is:
A compound having the formula:

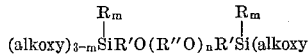

wherein R represents a member selected from the group consisting of the monovalent hydrocarbon radicals and the halogen-substituted monovalent hydrocarbon radicals, R' is a divalent hydrocarbon radical, R'' is an alkylene radical containing at least two carbon atoms, $n$ is an integer having a value of at least one, $m$ has a value from 0 to 2 and alkoxy represents an alkoxy radical selected from the group consisting of the methoxy, ethoxy, propoxy and butoxy radicals.

References Cited by the Examiner
UNITED STATES PATENTS
2,868,824   1/1959   Haluska _____ 260—448.2

FOREIGN PATENTS
1,179,743   12/1958   France.

TOBIAS E. LEVOW, *Primary Examiner.*
ANDREW M. BOETTCHER, *Examiner.*